United States Patent [19]
Konrad et al.

[11] Patent Number: 5,880,236
[45] Date of Patent: Mar. 9, 1999

[54] WATER-THICKENING COPOLYMERS OF ACRYLIC AND N-ALKYLMALEAMIC MONOMERS

[76] Inventors: Gerd Konrad, 33 Albert-Einstein-Allee; Heinrich Hartmann, 46 Weinheimer Strasse, both of 6703 Limburgerhof, Germany

[21] Appl. No.: 47,159

[22] Filed: Apr. 13, 1993

Related U.S. Application Data

[63] Continuation of Ser. No. 716,732, Jun. 17, 1991, abandoned.

[30] Foreign Application Priority Data

Jul. 31, 1990 [DE] Germany .......................... 40 24 207.2

[51] Int. Cl.$^6$ .................................................. C08F 220/58
[52] U.S. Cl. ......................... 526/304; 526/258; 526/264
[58] Field of Search ............................... 526/304, 307.2, 526/307.1

[56] References Cited

U.S. PATENT DOCUMENTS

| | | | |
|---|---|---|---|
| 2,821,521 | 1/1958 | Price | 526/304 |
| 3,041,315 | 6/1962 | Gerlich | 526/304 |
| 3,157,595 | 11/1964 | Johnson | 525/327.6 |
| 4,801,388 | 1/1989 | Fong | 526/304 |

*Primary Examiner*—Christopher Henderson

[57] ABSTRACT

Water-thickening copolymers are obtainable by copolymerization of (A) one or more monomers of the formula I $$R^1HC=CR^2R^3 \qquad I$$

where $R^1$ and $R^2$ can be identical or different and each is H or $C_1$–$C_5$-alkyl, and $R^3$ is $$-\overset{O}{\underset{\|}{C}}-NR^1R^2, \quad -\overset{O}{\underset{\|}{C}}-\overset{R^4}{\underset{|}{N}}-R^5-SO_3M,$$

-continued $$-\overset{O}{\underset{\|}{C}}-\overset{R^4}{\underset{|}{N}}-R^5-N\overset{R^6}{\underset{R^7}{\diagdown}}, \quad -\overset{R^4}{\underset{|}{N}}-\overset{O}{\underset{\|}{C}}-R^4,$$

$$-N\overset{CH=N}{\underset{CH=CH}{\diagdown}}, \quad -N\overset{CH_2-CH_2}{\underset{\underset{O}{\overset{\|}{C}}-CH_2}{\diagdown}},$$

$-COOM$, $-PO_3M_2$, $-SO_3M$ where $R^1$ and $R^2$ can be identical or different and each is H or $C_1$–$C_5$-alkyl, $R^4$ is H or $C_1$–$C_5$-alkyl, $R^5$ is $C_1$–$C_4$-alkylene, $R^6$ and $R^7$ can be identical or different and each is H or $C_1$–$C_3$-alkyl, and M is hydrogen or an alkali metal, ½ alkaline earth metal or ammonium ion, and (B) one or more monomers of the formula IIa or IIb $$XR^1C=CR^2Y \qquad IIa$$

$$R^4HC=\underset{\underset{A}{|}}{C}-CH_2B \qquad IIb$$

where $R^1$ and $R^2$ can be identical or different and each is H or $C_1$–$C_5$-alkyl, $R^4$ is H or $C_1$–$C_5$-alkyl, X is —COOM where M is hydrogen or alkali metal, ½ alkaline earth metal or ammonium ion, Y is $$-\overset{O}{\underset{\|}{C}}-NR^8R^9$$

where $R^8$ is $C_6$–$C_{30}$-alkyl, alkylaryl or aryl and $R^9$ is H, $C_1$–$C_{30}$-alkyl, alkylaryl or aryl, and A and B are different and each has the meaning of X or Y.

1 Claim, No Drawings

WATER-THICKENING COPOLYMERS OF ACRYLIC AND N-ALKYLMALEAMIC MONOMERS

CROSS-REFERENCE TO RELATED APPLICATION

This is a continuation of Ser. No. 07/716,732 filed Jun. 17, 1991, now abandoned.

The present invention relates to copolymers which increase the viscosity of aqueous solutions or suspensions, especially of electrolyte-containing aqueous solutions or suspensions, and to the use thereof.

There is a large number of industrial applications where aqueous solutions or suspensions of increased viscosity are employed. Thus, for example, in drilling for oil and gas the viscosity of the drilling fluid is adjusted by appropriate additives. It is likewise necessary in well cementation to adjust the viscosity of the cement slurries and their release of water to the formation. In the case of fracturing too, in which either supports or strong acids are forced under high hydraulic pressure into the formation to increase its permeability for oil production, agents are added to the aqueous phase to increase its viscosity to prevent sedimentation of the supports or increase the rate of reaction of the acid with the rock. It is also necessary in tertiary oil recovery to add to the flooding water substances which increase its viscosity in order to prevent fingering and to increase the drainage.

The agents used to increase the viscosity in the above applications must meet a number of requirements. Thus, for example, they must retain their activity at elevated temperature, high salt contents and in acidic or basic environments.

In most cases, natural, semisynthetic or synthetic polymers are employed to increase the viscosity of aqueous solutions or suspensions. The natural and semi-synthetic polymers are mostly polysaccharides and derivatives thereof, eg. hydroxyethylcellulose, carboxymethylcellulose, xanthan, guar or hydroxypropylguar. The synthetic polymers which are most commonly used are hydrolyzed polyacrylamides or copolymers of acrylamide and salts of acrylic acid. Whereas the viscosity-increasing effect of biopolymers usually has little dependence on the electrolyte content of the aqueous solution, these polymers have low thermal stability and, moreover, are relatively easily biodegraded. Polymers based on partially hydrolyzed polyacrylamide are resistant to biodegradation and more stable to hydrolysis than the biopolymers. However, the viscosity level depends very greatly on the electrolyte content of the aqueous solution so that addition of salt leads to a drastic fall in viscosity. The negative charges along the polymer chain, which are responsible, because of the mutual repulsion, for the increase in the hydrodynamic volume and thus in the viscosity, are shielded by the electrolytes to such an extent that disentanglement occurs and the viscosity-increasing effect is lost. In addition, in the presence of alkaline earth metal ions, hydrolyzed polyacrylamide solutions tend to precipitate, which drastically restricts their general utility. Aqueous solutions which contain acrylamide homopolymers cannot form precipitates with alkaline earth metal ions, and the viscosity level is hardly altered on addition of salt, but the viscosity level is relatively low in general.

U.S. Pat. Nos. 4,528,348, 4,612,332, 4,663,408, 4,694,046, 4,702,319 and 4,709,759 describe water-soluble copolymers which have a viscosity-increasing effect and are prepared from various mixtures of water-soluble monomers and a water-insoluble N-alkylacrylamide by polymerization in microemulsion. The disadvantage of this process is the relatively large amount of surfactant needed to solubilize the hydrophobic monomer. Isolation of the polymer is impeded by the surfactant content.

U.S. Pat. No. 4,541,935 describes copolymers of water-soluble monomers and water-insoluble long-chain (meth) acrylic esters. In this case too a large amount of surfactant is needed for solubilization. In addition, the hydrophobic monomer is, being an ester, relatively easily hydrolyzed.

U.S. Pat. No. 4,728,696 describes copolymers of water-soluble monomers and an amphiphilic acrylamide-based monomer. Besides the hydrophobic group, the amphiphilic monomer contains polyoxyethylene units which make it water-soluble.

DE-A 3 627 456 describes copolymers of acryl-amide, a salt of acrylic acid and an amphiphilic monomer which contains a (meth)acrylic moiety and an ionic group, in particular a sulfo group. However, the viscosities of the polymer solutions decrease drastically with increasing salt content.

EP-A1 0 311 799 describes polymers of two water-soluble monomers and one water-insoluble monomer, with dodecyl acrylate being particularly preferred.

EP-A2 0 335 624 discloses copolymers of water-soluble monomers and monomers with at least one $C_8$–$C_{30}$-alkyl, -alkenyl or -alkylaryl group. The monomer with the lipophilic group is preferably a cationic acrylic derivative.

The polymers which have been described all have disadvantages inasmuch as their solutions provide a viscosity level which is too low, the viscosity and solubility decrease drastically with increasing salt content of the solution, or copolymerization of the water-insoluble and water-soluble monomers is possible only in organic solvents or with the addition of large amounts of surfactant. If the hydrophobic group is connected via an ester linkage to the vinylic unit, the monomers are not sufficiently stable to hydrolysis at elevated temperature or pH. The increase in viscosity brought about by association of the hydrophobic side chains, by comparison with polymers without such hydrophobic groups, is cancelled out by the removal of the hydrophobic groups by hydrolysis from the main polymer chain. The use of amphiphilic monomers with alkyl, aryl or alkylaryl groups and polyalkoxylate substructures, eg. esters of acrylic acid and alkoxylated alkanols, additionally entails the risk of crosslinking. The formation of diols on alkoxylation cannot be ruled out so that esterification with, for example, acrylic acid results in bifunctional monomers which may lead to insoluble components in the polymer. The use of cationic monomers means that the polymers cannot be used for particular purposes, eg. tertiary oil recovery, because cationic polymers are known to be preferentially adsorbed onto rock formations.

It is an object of the present invention to develop polymers which do not have the disadvantages of the known polymers.

We have found that this object is achieved by water-thickening copolymers obtainable by copolymerization of (A) one or more monomers of the formula I $$R^1HC=CR^2R^3 \qquad \text{I}$$

where
$R^1$ and $R^2$ can be identical or different and each is H or $C_1$–$C_5$-alkyl, and $R^3$ is

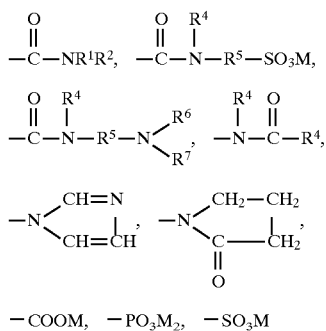

where $R^1$ and $R^2$ can be identical or different and each is H or $C_1$–$C_5$-alkyl, preferably $C_1$–$C_3$-alkyl, in particular methyl, $R^4$ is H or $C_1$–$C_5$-alkyl, preferably $C_1$–$C_3$-alkyl, in particular methyl, $R^5$ is $C_1$–$C_4$-alkylene, $R^6$ and $R^7$ can be identical or different and each is H or $C_1$–$C_3$-alkyl, preferably methyl, and M is hydrogen or an alkali metal, ½ alkaline earth metal or ammonium ion, and (B) one or more monomers of the formula IIa or IIb $$XR^1C=CR^2Y \qquad \text{IIa}$$

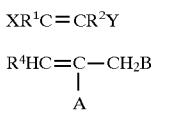

where $R^1$ and $R^2$ can be identical or different and each is H or $C_1$–$C_5$-alkyl, preferably $C_1$–$C_3$-alkyl, in particular methyl, $R^4$ is H or $C_1$–$C_5$-alkyl, preferably $C_1$–$C_3$-alkyl, in particular methyl, X is —COOM where M is hydrogen or alkali metal, ½ alkaline earth metal or ammonium ion, Y is

where $R^8$ is $C_6$–$C_{30}$-alkyl, alkylaryl or aryl and $R^9$ is H, $C_1$–$C_{30}$-alkyl, alkylaryl or aryl, and A and B are different and each has the meaning of X or Y.

The copolymers according to the invention are obtained by copolymerization of one or more monomers A with one or more monomers B.

Examples of suitable monomers A, ie. monomers of the formula I, are acrylamide, acrylic acid and salts thereof, acrylamidomethylpropanesulfonic acid (AMPS) and salts thereof, dimethylaminopropylmethacrylamide, methacrylic acid and salts thereof, methacrylamide, N-vinylformamide, N-vinylacetamide, N-vinylimidazole, N-vinylpyrrolidone, vinylphosphonic acid and salts thereof, vinylsulfonic acid and salts thereof. Preferably used are acrylamide and acrylic acid and salts thereof, particularly preferably acrylamide and AMPS and salts thereof.

Examples of monomers B, ie. monomers of the formulae IIa and IIb, which may be mentioned are N—$C_6$–$C_{30}$-alkyl-, N-alkylaryl- or N-aryl-substituted monoamides of maleic, fumaric, itaconic or citraconic acid or the alkali metal, alkaline earth metal or ammonium salts thereof. Examples of suitable alkylaryl and aryl groups are phenyl, naphthyl, benzyl and nonylphenyl.

The N-substituted monoamides of maleic, citraconic and itaconic acid can be obtained in a particularly straightforward manner by, for example, reacting the anhydrides with less than the stoichiometric amount of the relevant amine, eg. with from 0.5 to 0.99 mole, preferably 0.7 to 0.9 mole, of amine per mole of the dicarboxylic anhydride, expediently in the presence of a base, for example pyridine. The monoamides in the form of the acid are soluble in organic solvents, eg. methylene chloride but not in water, so that they can be easily isolated by treatment with, eg. by shaking with, aqueous acids, eg. hydrochloric or sulfuric acid, in the presence of an organic solvent. The monoamides can be obtained in high purity and free of ammonium salts by recrystallization from organic solvents, eg. methylene chloride.

The copolymers according to the invention generally contain from 50 to 99.99% by weight of monomer A and from 0.01 to 50% by weight of monomer B, preferably 80 to 99.9% by weight of monomer A and 0.1 to 20% by weight of monomer B, in particular 85 to 99% by weight of monomer A and 1 to 15% by weight of monomer B, in each case based on the total amount of monomers A and B contained in the copolymer.

The copolymers are generally composed of monomers A and B. Preference is given to salts of copolymers of acrylamide and N-alkylmaleamic acids and of terpolymers of acrylamide, acrylic acid and N-alkylmaleamic acids, and of acrylamide, acrylamidomethylpropanesulfonic acid and N-alkylmaleamic acids.

However, the copolymers can also contain from 0 to 20% by weight, preferably 0 to 10% by weight, based on the monomers A, of other monomers which preferably contain polar groups, eg. acrylonitrile, $C_1$–$C_3$-alkyl acrylates such as methyl acrylate, and vinyl acetate.

The polymers according to the invention can also contain from 0 to 5% by weight, preferably 0 to 3% by weight, of multifunctional vinylic monomers, eg. N,N'-divinylethyleneurea, methylenebis(meth)acrylamide, trimethylolpropane trisallyl ether, trimethylolpropane triacrylate, oligoalkylene glycol diacrylates, polyalkylene glycol diacrylates, butanediol diacrylate and hexanediol diacrylates. This results in crosslinked products which remain soluble in water when small amounts of these crosslinkers are added and form highly swelling gels when larger amounts of the crosslinkers are added. The swellability of these gels is retained even in water containing electrolytes. Crosslinked polymers according to the invention are particularly suitable for thickening printing pastes or for preparing superabsorbers which can be employed for absorbing aqueous electrolyte-containing liquids.

The K values (method of H. Fikentscher, Cellulosechemie 13 (1932), 58–64 and 71–74) of the polymers according to the invention are generally from 50 to 300 (0.1% strength in 5% strength sodium chloride solution), preferably from 70 to 300. The particularly preferred range depends on the intended use of the copolymers according to the invention. When they are used for thickening flooding water and in fracturing it is from 180 to 290. When they are used as additives in cement slurries for deep wells and for drilling fluids the preferred range of K values is from 80 to 150.

The copolymers according to the invention are prepared by conventional continuous or batchwise processes such as bulk, solution, precipitation, suspension or emulsion polymerization using conventional radical initiators such as, for example, acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), tert-butyl permaleate, 2,2'-azobis(isobutyronitrile), 2,2'-azobis(2-amidinopropane) dihydrochloride, bis(tert-butylperoxy) cyclohexane, tert-butyl peroxyisopropyl carbonate, tert-butyl peracetate, dicumyl peroxide, di-tert-amyl peroxide, di-tert-butyl peroxide, p-menthane hydroperoxide, cumene hydroperoxide, sodium, potassium and ammonium peroxodisulfate and tert-butyl hydroperoxide and mixtures thereof. These initiators are normally used in amounts of from 0.1 to 10%, preferably 0.2 to 5%, of the weight of the monomers.

The copolymers are preferably prepared by solution polymerization, which is preferably carried out in water as solvent, it being preferable for the all the monomers to be in solution in homogeneous phase. It may be advantageous to add to the aqueous solvent from 0 to 30% by weight, preferably 0 to 20% by weight, based on the complete solvent mixture, of a water-soluble organic solvent as solubilizer or to adjust a particular molecular weight. Examples of suitable organic solvents are alcohols such as methanol, ethanol, isopropanol and tert-butanol, ketones such as acetone, ethers such as dioxane and tetrahydrofuran, dimethylformamide, N-methylpyrrolidone, and dimethyl sulfoxide. In place of regulating solvents, it is also possible to use chain-transfer compounds, eg. ammonium formate or hydroxylammonium chloride, to adjust a particular molecular weight. The polymerization is normally carried out in the weakly acid, neutral or weakly alkaline range, expediently at a pH from 5 to 10, preferably 6 to 9. If the polymerization is carried out in pure water, the pH is preferably in the neutral to weakly alkaline range, preferably from 6 to 10, preferably 6.5 to 9. The pH is expediently such that all the monomers, including the monomers B carrying the hydrophobic group, remain in solution.

The copolymers according to the invention are particularly advantageously prepared by gel polymerization which is a special case of solution polymerization in which the gel effect is utilized to obtain high molecular weights. The gel polymerization is expediently carried out in such a way that a monomer solution from which oxygen has been removed and which contains, in general, from 5 to 50% by weight, preferably 7 to 40% by weight, in particular 10 to 30% by weight, of monomers together with the initiator is heated to the desired polymerization temperature under an inert gas. After the polymerization has started, initially a viscous solution is formed and finally becomes a firm polymer gel.

It is a particular advantage of the present invention that the copolymer preparation according to the invention results in water-soluble polymers with sufficiently high molecular weights for them to be used to increase the viscosity of aqueous electrolyte solutions.

Another advantage of the present invention is that the copolymerization can be carried out without added surfactants, and thus the copolymers do not contain any of the latter. This is a considerable advantage over polymerization processes in which the differences in solubility of the monomers mean that surfactants must be added, because removal of surfactants after polymerization is usually very complicated.

The polymerization is expediently carried out at from 0° to 150° C., preferably from 10° to 100° C., in particular from 20° to 80° C.

The copolymers according to the invention are used, for example, to increase viscosity in tertiary oil recovery, as additives to water-based drilling fluids or cement slurries for deep wells, and to increase the viscosity in fracturing, in which either supports or strong acids are forced under high hydraulic pressure into the oil-bearing formation in order to increase its permeability for oil production (cf. for example Das Buch vom Erdöl, page 76, Deutsche BP AG Hamburg, 1989 and U.S. Pat. No. 4,500,437).

The invention is explained in more detail by the following examples:

I. PREPARATION EXAMPLES

1. Preparation of the monomers of the formula IIa a) Preparation of N-dodecylmaleamic acid 30 g of pyridine are added to a solution of 83 g of maleic anhydride in 700 ml of dichloromethane at room temperature. A solution of 122 g of n-dodecyl-amine and 70 g of pyridine in 800 ml of dichloro-methane is then added dropwise in 15 min, during which the temperature rises to 39° C. The mixture is then refluxed for 30 min, cooled to 25° C. and 210 ml of 32% by weight aqueous hydrochloric acid are cautiously added. The aqueous phase is separated off at 35° C., and the organic phase is washed three times with 200 ml of water each time at 35° C., dried over sodium sulfate and crystallized at 10° C. 180 g (96%) of N-dodecylmaleamic acid are obtained in the form of colorless waxy crystals. The product is pure by NMR and gives a clear solution in dilute sodium hydroxide solution.

b) Preparation of N—$C_8/C_{18}$-alkylmaleamic acid

The procedure is as described in Example 1.a) but 50 g of maleic anhydride, 91 g of a $C_8$–$C_{18}$-alkylamine mixture (Noram Cd from Ceca) and a total of 60 g of pyridine and 1000 ml of dichloromethane are used. 103 g of N—$C_8$–$C_{18}$-alkylmaleamic acid are obtained in a yield of 77%. The product is pure by NMR and gives a clear solution in dilute sodium hydroxide solution.

2. Preparation of the copolymers according to the invention a) Preparation of Polymer A1

1.57 g of N-dodecylmaleamic acid from Example 1.a) are suspended in 50 g of water and, at 25° C., 25% by weight aqueous sodium hydroxide solution is added dropwise until all the amide has dissolved. The pH must not exceed 10 during this. 160 g of 50% by weight acrylamide solution, 410 g of water, 95 mg of a 40% by weight solution of pentasodium diethylene-triaminepentacetate and, to suppress foam, 80 mg of silicone oil (VP 1132 from Wacker-Chemie) are added to this solution. The solution is adjusted to pH 8.5, heated to 40°–45° C. and degassed by evacuation and ventilation with nitrogen three times. Then nitrogen is passed through for a further 30 min. Subsequently 8 ml of a 0.2% by weight aqueous solution of 2,2'-azobis(2'-amidinopropane) dihydrochloride are added as initiator. After 1 to 2 hours, when the mixture is just still stirrable, a further 10 ml of the initiator solution are added, and polymerization is continued at 50°–60° C. for a further 5 hours. Polymer A 1 is obtained as a clear gel containing about 12.5% by weight of polymer which, in the acid form, is composed of about 98.1% by weight of acrylamide and 1.9% by weight (0.5 mol %) of N-dodecylmaleamic acid.

b) Preparation of polymer B 1

1.38 g of N-dodecylmaleamic acid from Example 1.a) are suspended in 50 g of water and, at 25° C., 25% by weight aqueous sodium hydroxide solution is added dropwise until all the amide has dissolved. The pH must not exceed 10 during this. 128 g of 50% by weight acrylamide solution, a solution of 15.8 g of acrylamidomethylpropanesulfonic acid (AMPS) in 100 g of 3% by weight aqueous sodium hydroxide solution, 310 g of water, 95 mg of a 40% by weight solution of pentasodium diethylenetriaminepentaacetate and, to suppress foam, 80 mg of silicone oil (VP 1132 from Wacker-Chemie) are added to this solution. The solution is adjusted to pH 8.5, heated to 45°–50° C. and degassed by evacuation and ventilation with nitrogen three times. Nitrogen is then passed through for a further 30 min. 8 ml of a 0.2% by weight solution of 2,2'-azobis(2-amidinopropane) dihydrochloride are then added as initiator. After 1 to 2 hours, when the mixture is just still stirrable, a further 10 ml of initiator solution are added, and polymerization is continued at 50°–60° C. for a further 5 hours. Polymer B 1 is obtained as a clear gel containing about 12.5% by weight of polymer which is composed, based on the acid form, of about 78.6% by weight of acrylamide, about 19.7% by weight of AMPS and 1.68% by weight (0.5 mol %) of N-dodecylmaleamic acid.

c) Preparation of other polymers

The polymers listed in Table 1 which follows were prepared in a similar manner to polymers A 1 and B 1. The numbers in Table 1 indicate the compositions of polymers A 0–6, B 0–6, C 0, C 2, D 0 and D 2 in % by weight.

Each of the experiments numbered 0 is a comparative example prepared under the same conditions as for all the other polymers but containing no monomers with hydrophobic side chains.

TABLE 1

| Polymer | AM | AMPS | AS | MS-12 | MS-8/18 | |
|---|---|---|---|---|---|---|
| A 0 | 100 | — | — | — | — | comparative polymer |
| A 1 | 98.1 | — | — | 1.9 | — | |
| A 2 | 96.2 | — | — | 3.8 | — | |
| A 3 | 92.7 | — | — | 7.3 | — | |
| A 4 | 97.9 | — | — | — | 2.1 | |
| A 5 | 95.9 | — | — | — | 4.1 | |
| A 6 | 92.1 | — | — | — | 7.9 | |
| B 0 | 80 | 20 | — | — | — | comparative polymer |
| B 1 | 78.6 | 19.7 | — | 1.7 | — | |
| B 2 | 77.4 | 19.3 | — | 3.3 | — | |
| B 3 | 75.1 | 18.8 | — | 6.1 | — | |
| B 4 | 78.6 | 19.6 | — | — | 1.8 | |
| B 5 | 77.1 | 19.3 | — | — | 3.6 | |
| B 6 | 74.5 | 18.6 | — | — | 6.9 | |
| C 0 | 90 | — | 10 | — | — | comparative polymer |
| C 2 | 86.8 | — | 9.6 | 3.6 | — | |
| D 0 | 80 | — | 20 | — | — | comparative polymer |
| D 2 | 86.8 | — | 9.6 | 3.6 | — | comparative polymer |

AM = acrylamide
AMPS = acrylamidomethylpropanesulfonic acid
AS = acrylic acid
MS-12 = N-dodecylmaleamic acid (from Example 1.a)
MS-8/18 = N-C$_8$/C$_{18}$-alkylmaleamic acid (from Example 1.b)

II. EXAMPLES OF USE 1.0% by weight solutions were prepared from the polymer gels by vigorous stirring at 80° C. These were diluted to 0.5% by weight with a) the same amount of water (solution a)

b) the same amount of 20% by weight aqueous NaCl solution (solution b), and the viscosities of these solutions were determined at various shear rates in a Brookfield RTV C/P viscometer with a CP-41 spindle at room temperature (23° C.). The results are listed in Table 2.

TABLE 2

Viscosities in mPa · s as a function of the shear rate and the salinity

| | Solution a (0.5% by weight water) | | | Solution b (0.5% by weight in 10% by weight NaCl solution) | | |
|---|---|---|---|---|---|---|
| Shear rate l/s | | | | | | |
| Polymer | 1.0 | 10 | 40 | 1.0 | 10 | 40 |
| A 0 | 738 | 258 | 116 | 443 | 185 | 92 |
| A 1 | 738 | 246 | 123 | 1230 | 308 | 150 |
| A 2 | 787 | 283 | 140 | 3075 | 664 | 275 |
| A 3 | 738 | 258 | 135 | 4920 | 1230 | 509 |
| A 4 | 1230 | 369 | 166 | 1353 | 369 | 166 |
| A 5 | 2460 | 640 | 248 | 2960 | 492 | 226 |
| A 6 | 2830 | 664 | 295 | 3695 | 622 | 485 |
| B 0 | 3075 | 690 | 261 | 172 | 98 | 61 |
| B 1 | 2830 | 665 | 257 | 615 | 221 | 123 |
| B 2 | 3321 | 738 | 287 | 1476 | 418 | 201 |
| B 3 | 2583 | 566 | 224 | 2460 | 590 | 246 |
| B 4 | 2952 | 689 | 270 | 984 | 283 | 147 |
| B 5 | 4180 | 900 | 280 | 1910 | 445 | 206 |
| B 6 | 4550 | 920 | 330 | 2950 | 550 | 260 |
| C 0 | 3440 | 790 | 310 | 369 | 160 | 89 |
| C 2 | 4080 | 886 | 332 | 1230 | 369 | 184 |
| D 0 | 5660 | 1107 | 390 | 246 | 148 | 80 |
| D 2 | 5166 | 1033 | 400 | 738 | 271 | 141 |
| Xanthan | 1722 | 418 | 154 | 2706 | 566 | 203 |

Comparison of A 1 to A 6 with the comparative example A 0 clearly reveals the considerably higher viscosity level of the polymers according to the invention, which is especially evident in concentrated electrolyte solutions. There is generally seen to be a large increase in viscosity on changing from water to NaCl solution. With polymers B, C and D there is a distinct decrease in viscosity on changing from water to NaCl, which is a consequence of the more ionic character of these polymers. However, the decrease in viscosity with the examples according to the invention is considerably less than with the comparative examples. As the examples of polymer B 3 shows it is, however, possible to prepare, by combining an ionic constituent and monomers of the formulae IIa and IIb, a polymer whose viscosities in NaCl solution and in pure water are scarcely distinguishable.

Inclusion of the monomers MS-12 and MS-8/18 results in the dependence of the viscosity on the shear rate being greater with polymers A 1–6, B 1–6, C 2 and D 2 than is the case in the comparative experiments A 0, B 0, C 0 and D 0. The greater dependence on the shear rate can be explained by association of the hydrophobic side groups derived from the monomers MS-12 and MS-8/18 becoming more difficult as the shear rate increases.

Depending on the shear rate, the polymers according to the invention have viscosities in NaCl solution which are up to 15 times those of the comparative examples. Comparison with xanthan (polysaccharide) shows that its viscosity level can also be exceeded.

We claim:

1. A water-thickening copolymer, consisting essentially of:

(a) from 85 to 99% by weight of acrylamide copolymerized with (b) from 1 to 15% by weight of at least one monomer selected from the group consisting of N-dodecylmaleamic acid and N—C$_8$/C$_{18}$-alkylmaleamic acid;

said copolymer having a viscosity of greater than 443 mPa.s at a shear rate of $1.0s^{-1}$ at 0.5% by weight in 10% by weight NaCl solution.

* * * * *